United States Patent [19]
Shumate et al.

[11] 3,784,124
[45] Jan. 8, 1974

[54] FISHING REEL
[76] Inventors: Marvin T. Shumate, 2316 Liverpool, Mesquite, Tex. 75149; Bobby G. Williams, 9551 Crestshire, Dallas, Tex. 75217
[22] Filed: Oct. 22, 1971
[21] Appl. No.: 191,740

Related U.S. Application Data
[63] Continuation-in-part of Ser. No. 26,586, April 8, 1970, abandoned.

[52] U.S. Cl. .................. 242/84.1 R, 242/84.5 R
[51] Int. Cl. ................................. A01k 89/02
[58] Field of Search .............. 242/84.1 R, 84.1 J, 242/84.5 R, 84.51 R, 99, 100, 101, 106

[56] References Cited
UNITED STATES PATENTS

| | | | |
|---|---|---|---|
| 1,554,082 | 9/1925 | Gerould | 242/100 UX |
| 2,398,805 | 4/1946 | Pomeroy | 242/99 X |
| 2,376,407 | 5/1945 | Wells | 242/99 |
| 328,341 | 10/1885 | Roberts | 242/84.5 X |
| 2,993,661 | 7/1961 | D'Arrigo | 242/106 |
| 1,447,538 | 5/1923 | Fullington | 242/100 X |

OTHER PUBLICATIONS
Popular Mechanics, July 1952, page 153

*Primary Examiner*—Billy S. Taylor
*Attorney*—D. Carl Richards et al.

[57] ABSTRACT

A reel designed primarily for cane pole fishing, the device having a construction which eliminates need to wind the line around the pole for adjusting length when fishing at different depths, one embodiment of the device comprising a housing securable to the fishing pole, a one-piece spool for storing line not in use, a housing end for enclosing the spool within the housing, a spool handle of crank shape and a winged nut for fitting the spool handle through the housing end, spool and spool housing, the spool handle serving to rotate the spool. In another embodiment of the invention, the reel is formed by the engagement of a housing having an annular shoulder adjacent its open end with a unitary spool body having an axle, two flanges and a crank.

2 Claims, 6 Drawing Figures

PATENTED JAN 8 1974

INVENTORS
MARVIN T. SHUMATE
and
BOBBY G. WILLIAMS

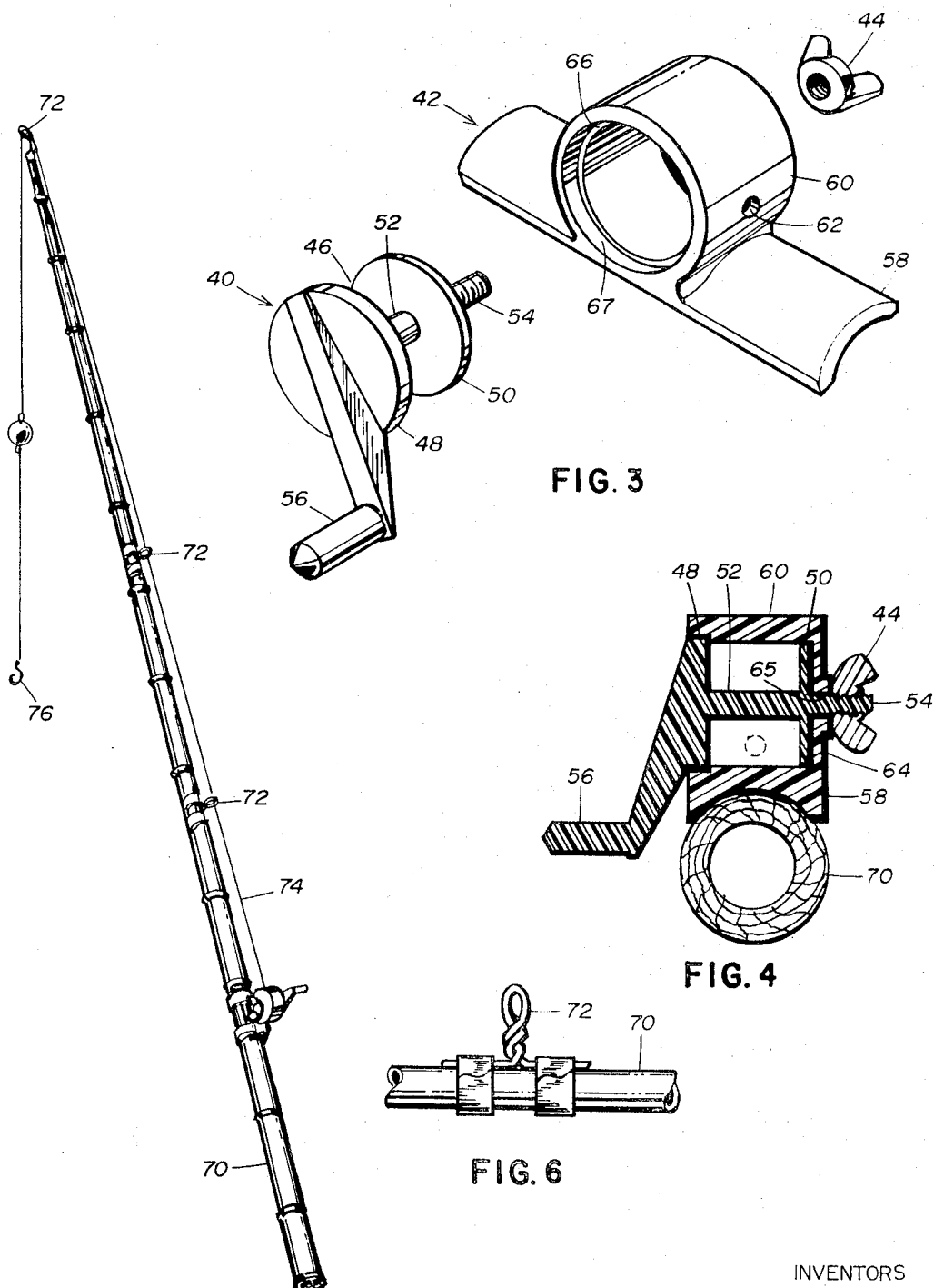

FISHING REEL

This invention relates generally to fishing reels. This is a continuation-in-part to our application Ser. No. 26,586, filed Apr. 8, 1970, now abandoned.

A principal purpose of the present invention is to provide a reel that is designed primarily for cane pole fishing and which is intended to eliminate the necessity to wind the line around the pole so to shorten or unwind as well as lengthen the same for different depths of fishing.

Another object of the present invention is to provide a reel which although adapted principally for cane pole fishing is however operative efficiently on a common rod.

Another object of the present invention is to provide a reel which makes it possible to reach under low hanging branches without tangling the line therewith.

Other objects of the present invention are to provide a reel which is simple in design, inexpensive to manufacture, rugged in construction, easy to use and efficient in operation.

These and other objects will be readily evident upon a study of the following specification and the accompanying drawing wherein:

FIG. 3 is an exploded perspective view of another embodiment of the invention;

FIG. 4 is a cross sectional view of the reel of FIG. 3 mounted on a fishing pole; and FIG. 5 is a perspective view of a reel embodying the invention mounted on a cane pole; and FIG. 6 is a side view of a portion of FIG. 5, showing the attachment of eyes to the pole.

Figure 1:
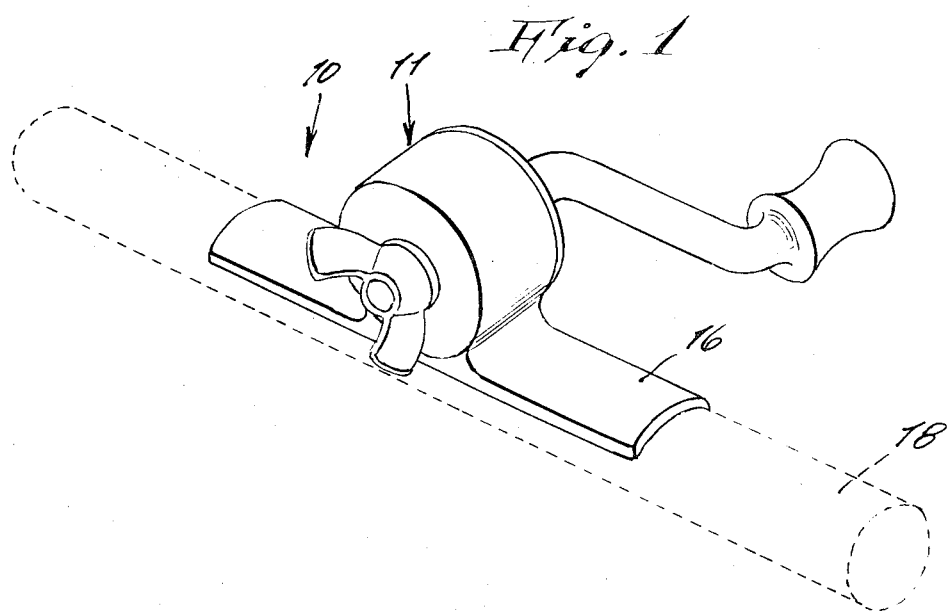
FIG. 1 is a perspective view showing one embodiment of the present invention assembled.

Referring now to the drawing in detail, the reference numeral 10 represents one embodiment of a reel constructed according to the present invention wherein there is a housing assembly 11 comprised of a housing 12 and a housing end 13 which fit together so as to form a central enclosure there within and within which a spool 14 is contained.

The housing 12 comprises a generally cylindrical cup configurated case 15 which is formed integrally with an elongated base plate 16 that is transversely arcuate as shown at 17 so as to be fitted against the cylindrical side of a cane pole 18. The case includes a cylindrical side wall 19 and a circular end wall 20 having a central opening 21 therethrough.

An opening 22 formed in the cylindrical side wall 19 and formed on a front side thereof serves to dispense and rewind the fishing line that is wound up on the reel spool 14.

The edge of the cylindrical side wall that is opposite thereof adjacent the end wall 20 provided an access opening into the interior of the case, the opening being sufficiently large so that the spool 14 can be readily fitted there into.

The spool comprises a central cylindrical drum 23 having a flat radially outwardly extending flange 24 at each end thereof so to form a space 25 there between and within which the fishing line is wound upon the drum.

A central opening 26 extends through the spool, the opening 26 being provided with projections 27 for being fitted into grooves 28 of a crank-shaped spool handle 29.

The housing end 13 comprises a circular plate with a central opening 30 therethrough, the circular plate having a circular flange 31 there around for abutting against the edge of the housing 12 when the housing end is assembled with the housing.

The spool handle 29 is formed with a crank handle knob 32 at one end thereof, the opposite end of the crank-configurated spool handle having a screw thread 33 which is threadingly engagable with a winged nut 34 of standard configuration.

It is to be noted that the spool handle is provided with an integral collar 35 which abuts with the outer side of the housing end 13. It is also to be noted that the spool is of a size so as to store approximately 40 to 50 feet of number fifteen test mono-filament line.

In assembling the components of the reel, the threaded end of the spool handle is fitted through the housing end, the spool, the housing and is then threadingly fitted to the winged nut, thereby completing the assembly.

The base plate of the reel is secured upon the cane pole in any conventional manner. The reel may be sold with all attachments for securement to the can pole. These include eyelets and fastening material as well as band holders so to attach the reel to the pole.

Even though the reel is not designed for use in casting, it can be used for short distances, by using it as a fly rod or by using a heavy weight for bottom fishing.

The reel is simple in construction, having no gears or locks. Drag is controlled by pressure applied to the spool by tightening the winged nut, pushing the end of the case against the spool. The reel has only one moving part which comprises the spool attached to the spool handle.

Another embodiment of the invention is shown in FIGS. 3 and 4. The structure illustrated there is in three pieces, a unitary spool body 40, a housing body 42, and a wing nut 44.

The spool body 40 has integrally formed thereon a spool 46, having spaced flanges 48 and 50, and a central axle 52, which is provided with external threads 54 at one end. A crank 56 is formed on the outer flange 48.

The housing body 42 is a one piece member having an arcuate mounting plate 58 and a generally cylindrical hollow housing 60. The housing 60 is provided with an aperture 62 through its side wall, and has a closed end 64 with an aperture 65, and an open end. The inner diameter of the hosuing 60 is enlarged adjacent the open end, forming an annular shoulder 66, and an inward facing bearing surface 67.

The reel is assembled by placing the spool 46 into the housing 60 through the open end thereof, inserting the threaded end 54 of the axle 52 through the aperture 65. Wing nut 44 is placed on axle 52 to retain the pieces in position.

The diameter of the spool flange 50 is small enough to pass by the annular shoulder 66, but large enough so that it will slidingly confront the interior surface of housing 60 adjacent the closed end so that the edge of flange 50 and the housing 60 cooperate as bearing surfaces. The flange 48 is dimensioned so that it slidingly confronts the annular shoulder 66, and the inward facing bearing surface 67, when the spool 46 is fully inserted into the housing 60.

Thus, there are bearing surfaces not only at the point where the axle 52 rides in aperture 65, but also at the outer edge of the spool flanges 48 and 50. When it is desired to brake the reel against rotation, drag may be affected on the spool by tightening the nut 44, bringing the flanges 48 and 50 into tightened engagement with the shoulder 66 and closed end 64, respectively.

Figure 2:
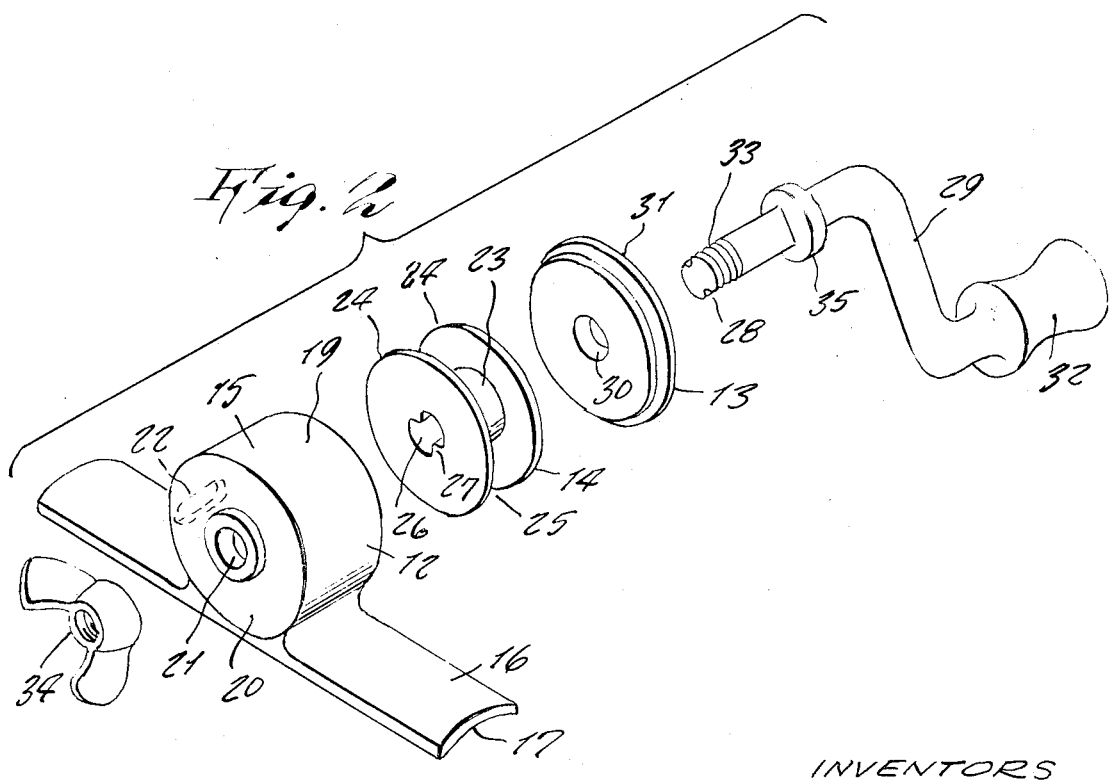
FIG. 2 is an exploded perspective view of the components of the reel shown in FIG. 1.

The reels illustrated in FIGS. 1–4 may be used on a cane fishing pole as illustrated in FIG. 5. A pole 70 may be fitted with a reel of this type by taping or otherwise affixing the mounting plate directly onto the rod 70. Eyes 72, for guiding the fishing line 74 along the pole may be provided by similar attachement to the rod 70. The reel may then be used to adjust the length of the line 74 to the appropriate desired length. The rod and reel may be conveniently arranged for transportation and storage by reeling in the line 74 until the hook 76 is placed against the last eye 72. The reel may then be locked. This greatly simplifies the task of transportation and storage of the rod with the line, reducing the possibility of snagging persons or goods with the hook, without having to remove the hook from the line. It is unnecessary to remove the line from the pole or hook from the line, or to go through the cumbersome tasks of winding or unwinding line around the pole.

Having described the invention with certain specific embodiments thereof, it is to be understood that further modifications may now suggest themselves to those skilled in the art and it is intended to cover such modifications as fall within the scope of the appended claims.

What is claimed is:

1. A fishing reel comprising:

a generally cylindrical housing having an open end and a closed end having a central aperture, the housing having an outward axially facing annular shoulder formed on its inner surface adjacent the open end and a cylindrical bearing surface adjacent the shoulder;

a unitary spool body having a crank, an axle with threaded end and a pair of spaced flanges thereon, the flange nearer the threaded end of the axle having a diameter small enough that the flange may be inserted through the open end of the housing past the annular shoulder, the second flange adapted to slidably confront the shoulder and bearing surface when the threaded end of the axle is placed through the aperture of the closed end of the housing; and nut means for engaging the threaded end of the axle so that tightening of the nut means secures the spool body against rotation by engaging the second flange with the shoulder.

2. The device of claim 1, wherein the edge of first flange slides against the wall of the housing, and the first flange confronts the closed end of the housing so that tightening of the nut causes tightened engagement of the first flange with the closed end.

* * * * *